(12) United States Patent
Thyni et al.

(10) Patent No.: US 11,797,712 B2
(45) Date of Patent: Oct. 24, 2023

(54) VERIFYING DATA INTEGRITY

(71) Applicant: Telefonaktiebolaget LM Ericsson (publ), Stockholm (SE)

(72) Inventors: Tomas Thyni, Järfälla (SE); Bernard Smeets, Dalby (SE); Tommy Arngren, Södra Sunderbyn (SE); Daniel Bergström, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 17/289,283

(22) PCT Filed: Oct. 29, 2018

(86) PCT No.: PCT/EP2018/079552
§ 371 (c)(1),
(2) Date: Apr. 28, 2021

(87) PCT Pub. No.: WO2020/088735
PCT Pub. Date: May 7, 2020

(65) Prior Publication Data
US 2021/0390213 A1    Dec. 16, 2021

(51) Int. Cl.
*H04L 29/06*     (2006.01)
*G06F 21/64*     (2013.01)
(Continued)

(52) U.S. Cl.
CPC .............. *G06F 21/64* (2013.01); *G06F 16/27* (2019.01); *H04L 9/0825* (2013.01);
(Continued)

(58) Field of Classification Search
None
See application file for complete search history.

(56) References Cited

U.S. PATENT DOCUMENTS 9,208,335 B2 * 12/2015 Wu ........................ H04L 9/3234
10,075,425 B1    9/2018 Waugh et al.
(Continued)

OTHER PUBLICATIONS

Li, Min et al. An asymmetric watermarking scheme for relational database. 2011 IEEE 3rd International Conference on Communication Software and Networks. https://ieeexplore.ieee.org/stamp/stamp.jsp?tp=&arnumber=6014246 (Year: 2011).*
(Continued)

*Primary Examiner* — Jeremiah L Avery
(74) *Attorney, Agent, or Firm* — SAGE PATENT GROUP

(57) ABSTRACT

It is provided a method for enabling a user device to verify data integrity. The method is performed in a network node and includes: obtaining measurement data indicating resource usage by the user device; obtaining a session identifier; generating a measurement indicator using a one-way function, based on the measurement data; generating an asymmetric cryptographic signature of the session identifier and the measurement indicator, the asymmetric cryptographic signature being based on a private key of a cryptographic key pair of the network node; and storing, in a distributed ledger database, a set of data comprising the asymmetric cryptographic signature, the session identifier and the measurement indicator.

20 Claims, 5 Drawing Sheets

(51) Int. Cl.
*G06F 16/27* (2019.01)
*H04L 9/08* (2006.01)
*H04L 9/30* (2006.01)
*H04L 9/32* (2006.01)

(52) U.S. Cl.
CPC .......... *H04L 9/3073* (2013.01); *H04L 9/3247* (2013.01); *H04L 9/3268* (2013.01)

(56) References Cited

U.S. PATENT DOCUMENTS

| | | | |
|---|---|---|---|
| 2017/0046694 A1 | 2/2017 | Chow et al. | |
| 2017/0302663 A1 | 10/2017 | Nainar et al. | |
| 2018/0025442 A1* | 1/2018 | Isaacson | H04L 51/48 705/26.62 |
| 2018/0183586 A1* | 6/2018 | Bhargav-Spantzel | G06F 21/32 |
| 2018/0232817 A1* | 8/2018 | Isaacson | G06F 3/048 |
| 2018/0295546 A1* | 10/2018 | Crawford | H04L 67/148 |

OTHER PUBLICATIONS

Wanjun, Yu; Yuan, Wu. Research on Network Trading System Using Blockchain Technology.2018 International Conference on Intelligent Informatics and Biomedical Sciences (ICIIBMS). https://ieeexplore.ieee.org/stamp/stamp.jsp?tp=&arnumber=8550004 (Year: 2018).*

International Search Report and Written Opinion of the International Searching Authority, PCT/EP2018/079552, dated Jun. 27, 2019, 11 pages.

* cited by examiner

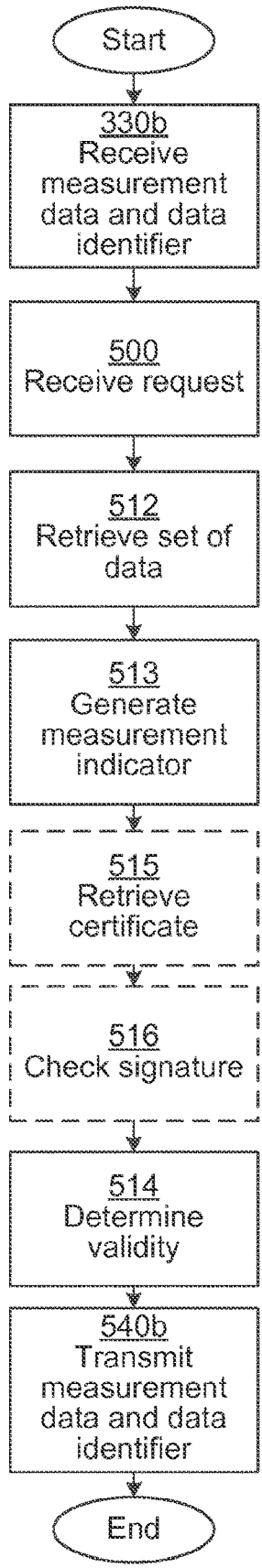
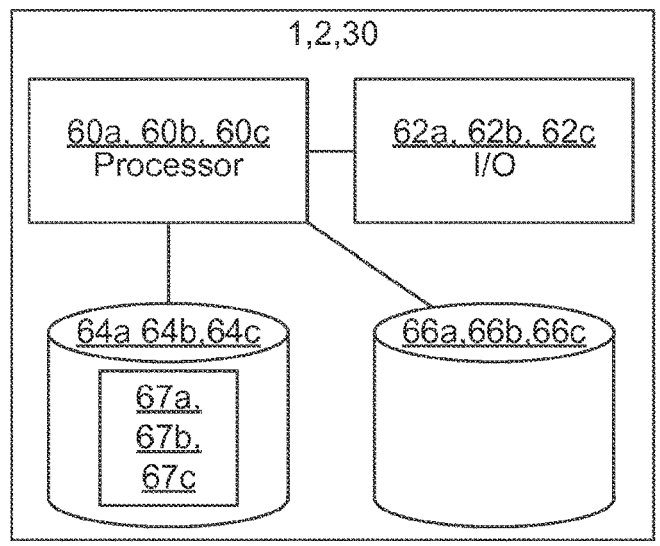
Fig. 6
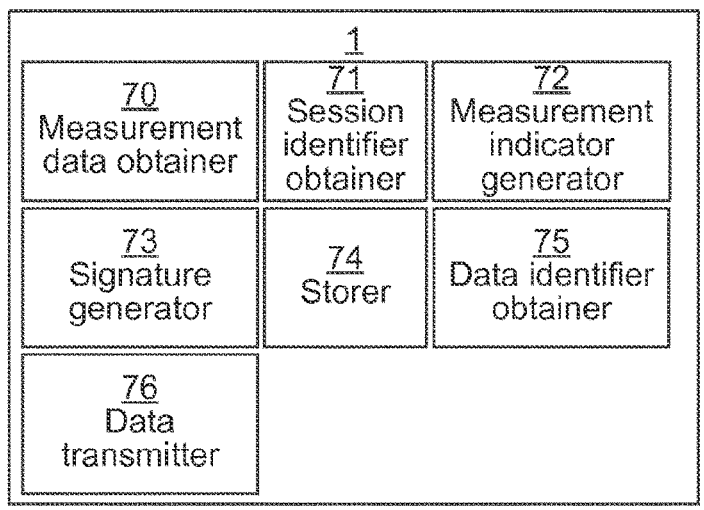
Fig. 7
Fig. 5B

VERIFYING DATA INTEGRITY

CROSS REFERENCE TO RELATED APPLICATIONS

This application is a 35 U.S.C. § 371 national stage application of PCT International Application No. PCT/EP2018/079552 filed on Oct. 29, 2018, the disclosure and content of which is incorporated by reference herein in its entirety.

TECHNICAL FIELD

The invention relates to methods, a network node, a user device, an operator node, computer programs and computer program products for enabling a user device to verify data integrity.

BACKGROUND

It is of great importance to keep measurements of data consumption and service delivery for each user in cellular communication network. However, the measurements themselves are often disputed by the user that consumes a network service or data, and sometimes also by the service provider, often the Mobile Network Operator (MNO), when the service provider does not fully control the radio access network (RAN). There is a lack of trust that such measurements are always correct.

Measurements from different nodes in the cellular communication network are not time stamped, which makes it difficult to correlate measurement data from the different nodes in the network.

Furthermore, in the future, more nodes will increasingly use cloud computing resources for its implementation. Having no longer the hardware as trustworthy anchor point for the processing raises even more concerns on the trustworthiness of measurements of data and service consumption.

Hence, there is a need for a comprehensive and efficient solution which solves the issue of trust for measurements in cellular communication networks.

SUMMARY

According to a first aspect, it is provided a method for enabling a user device to verify data integrity. The method is performed in a network node and comprising the steps of: obtaining measurement data indicating resource usage by the user device; obtaining a session identifier; generating a measurement indicator using a one-way function, based on the measurement data; generating an asymmetric cryptographic signature of the session identifier and the measurement indicator, the asymmetric cryptographic signature being based on a private key of a cryptographic key pair of the network node; and storing, in a distributed ledger database, a set of data comprising the asymmetric cryptographic signature, the session identifier and the measurement indicator.

The method may further comprise the steps of: receiving a data identifier from the distributed ledger database, the data identifier being associated with the set of data stored in the step of storing; and transmitting the measurement data and the data identifier to an operator node.

The one-way function may be a hash function.

The set of data may further comprise a public key of the cryptographic key pair.

The cryptographic key pair may be specific for the network node.

According to a second aspect, it is provided a network node method for enabling a user device to verify data integrity. The network node comprises: a processor, and a memory storing instructions that, when executed by the processor, cause the network node to: obtain measurement data indicating resource usage by the user device; obtain a session identifier, generate a measurement indicator using a one-way function, based on the measurement data; generate an asymmetric cryptographic signature of the session identifier and the measurement indicator, the asymmetric cryptographic signature being based on a private key of a cryptographic key pair of the network node; and store, in a distributed ledger database, a set of data comprising the asymmetric cryptographic signature, the session identifier and the measurement indicator.

The network node may further comprise instructions that, when executed by the processor, cause the network node to: receive a data identifier from the distributed ledger database, the data identifier being associated with the set of data stored in the step of storing; and transmit the measurement data and the data identifier to an operator node.

The one-way function may be a hash function.

The set of data may further comprise a public key of the cryptographic key pair.

The cryptographic key pair may be specific for the network node.

According to a third aspect, it is provided a computer program for enabling a user device to verify data integrity. The computer program comprises computer program code which, when run on a network node causes the network node to: obtain measurement data indicating resource usage by the user device; obtain a session identifier, generate a measurement indicator using a one-way function, based on the measurement data; generate an asymmetric cryptographic signature of the session identifier and the measurement indicator, the asymmetric cryptographic signature being based on a private key of a cryptographic key pair of the network node; and store, in a distributed ledger database, a set of data comprising the asymmetric cryptographic signature, the session identifier and the measurement indicator.

According to a fourth aspect, it is provided a computer program product comprising a computer program according to the third aspect and a computer readable means on which the computer program is stored.

According to a fifth aspect, it is provided a method for enabling a user device to verify data integrity. The method is performed in the user device and comprises the steps of: receiving measurement data and a data identifier, retrieving, using the data identifier, from a distributed ledger database, a set of data comprising a session identifier and a stored measurement indicator; generating a verification measurement indicator using a one-way function, based on the measurement data; and determining that the measurement data is valid when the stored measurement indicator and the verification measurement indicator match.

The set of data may further comprise an asymmetric cryptographic signature. In such a case, the method further comprises the step of: checking integrity of the session identifier and the measurement indicator based on the asymmetric cryptographic signature.

The method may further comprise the step of: retrieving a digital certificate from the distributed ledger database. In such a case, the step of checking integrity is also based on the digital certificate.

The set of data may further comprise a root certificate associated with the asymmetric cryptographic signature. In such a case, the step of checking integrity of the session identifier is based also on the root certificate.

According to a sixth aspect, it is provided a user device for enabling the user device to verify data integrity. The user device comprises: a processor, and a memory storing instructions that, when executed by the processor, cause the user device to: receive measurement data and a data identifier; retrieve, using the data identifier, from a distributed ledger database, a set of data comprising a session identifier and a stored measurement indicator; generate a verification measurement indicator using a one-way function, based on the measurement data; and determine that the measurement data is valid when the stored measurement indicator and the verification measurement indicator match.

The set of data may further comprise an asymmetric cryptographic signature. In such a case, the user device further comprises instructions that, when executed by the processor, cause the user device to: check integrity of the session identifier and the measurement indicator based on the asymmetric cryptographic signature.

The user device may further comprise instructions that, when executed by the processor, cause the user device to: retrieve a digital certificate from the distributed ledger database. In such a case, the instructions to check integrity comprises instructions that, when executed by the processor, cause the user device to also base the checking on the digital certificate.

The set of data may further comprise a root certificate associated with the asymmetric cryptographic signature. In such a case, the instructions to check integrity of the session identifier comprise instructions that, when executed by the processor, cause the user device to check integrity based also on the root certificate.

According to a seventh aspect, it is provided a computer program for enabling the user device to verify data integrity. The computer program comprises computer program code which, when run on a user device causes the user device to: receive measurement data and a data identifier; retrieve, using the data identifier, from a distributed ledger database, a set of data comprising a session identifier and a stored measurement indicator; generate a verification measurement indicator using a one-way function, based on the measurement data; and determine that the measurement data is valid when the stored measurement indicator and the verification measurement indicator match.

According to an eighth aspect, it is provided a computer program product comprising a computer program according to the seventh aspect and a computer readable means on which the computer program is stored.

According to a ninth aspect, it is provided a method for enabling a user device to verify data integrity. The method is performed in an operator node and comprises the steps of: receiving measurement data and a data identifier from a network node, the data identifier being associated with a stored set of data in a distributed ledger database; receiving a request for measurement data from a user device; retrieving, using the data identifier, from a distributed ledger database, a set of data comprising a session identifier and a stored measurement indicator; generating a verification measurement indicator using a one-way function, based on the measurement data; determining that the measurement data is valid when the stored measurement indicator and the verification measurement indicator match; and transmitting measurement data and a data identifier to the user device when the measurement data is determined to be valid.

The set of data further may comprise an asymmetric cryptographic signature. In such a case, the method further comprises the step of: checking integrity of the session identifier and the measurement indicator based on the asymmetric cryptographic signature.

The method may further comprise the step of: retrieving a digital certificate from the distributed ledger database. In such a case, the step of checking integrity is also based on the digital certificate.

The set of data may further comprise a root certificate associated with the asymmetric cryptographic signature. In such a case, the step of checking integrity of the session identifier is based also on the root certificate.

According to a tenth aspect, it is provided an operator node for enabling a user device to verify data integrity. The operator node comprises: a processor; and a memory storing instructions that, when executed by the processor, cause the operator node to: receive measurement data and a data identifier from a network node, the data identifier being associated with a stored set of data in a distributed ledger database; receive a request for measurement data from a user device; retrieve, using the data identifier, from a distributed ledger database, a set of data comprising a session identifier and a stored measurement indicator; generate a verification measurement indicator using a one-way function, based on the measurement data; determine that the measurement data is valid when the stored measurement indicator and the verification measurement indicator match; and transmit measurement data and a data identifier to the user device when the measurement data is determined to be valid.

The set of data may further comprise an asymmetric cryptographic signature. In such a case, the operator node further comprises instructions that, when executed by the processor, cause the operator node to: check integrity of the session identifier and the measurement indicator based on the asymmetric cryptographic signature.

The operator node may further comprise instructions that, when executed by the processor, cause the operator node to: retrieve a digital certificate from the distributed ledger database. In such a case, the instructions to check integrity comprise instructions that, when executed by the processor, cause the operator node to check integrity also based on the digital certificate.

The set of data may further comprise a root certificate associated with the asymmetric cryptographic signature. In such a case, the instructions to check integrity of the session identifier comprise instructions that, when executed by the processor, cause the operator node to check integrity also based on the root certificate.

According to an eleventh aspect, it is provided a computer program for enabling a user device to verify data integrity. The computer program comprises computer program code which, when run on an operator node causes the operator node to: receive measurement data and a data identifier from a network node, the data identifier being associated with a stored set of data in a distributed ledger database; receive a request for measurement data from a user device; retrieve, using the data identifier, from a distributed ledger database, a set of data comprising a session identifier and a stored measurement indicator; generate a verification measurement indicator using a one-way function, based on the measurement data; determine that the measurement data is valid when the stored measurement indicator and the verification measurement indicator match; and transmit measurement data and a data identifier to the user device when the measurement data is determined to be valid.

According to a twelfth aspect, it is provided a computer program product comprising a computer program according to the eleventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 5A-B are flow charts illustrating embodiments of methods for enabling a user device to verify data integrity, performed in an operator node;

FIG. 6 is a schematic diagram illustrating components of each one of the network node, user device and operator node of FIG. 1;

FIG. 7 is a schematic diagram showing functional modules of the network node of FIG. 1 according to one embodiment;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on using a distributed ledger database to store a set of data which can be used to verify data measurements relating to resource usage (e.g. data consumption and/or service consumption). The measurement data itself can be stored elsewhere and does not need to be stored in the distributed ledger. This allows the measurement data to be checked both efficiently and securely by a user device or an operator node and also provides privacy protection of measurement data.

Figure 1:
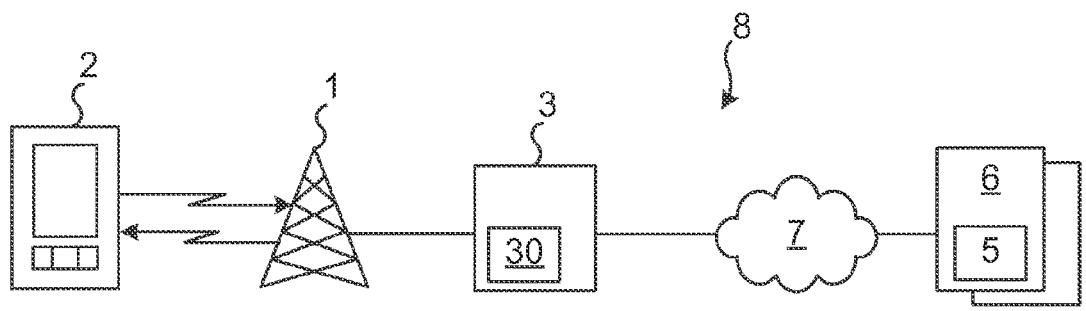
FIG. 1 is a schematic diagram illustrating a cellular communication network where embodiments presented herein may be applied

FIG. 1 is a schematic diagram illustrating a cellular communication network 8 where embodiments presented herein may be applied. The cellular communication network 8 comprises a core network 3 and one or more network nodes 1, here in the form of radio base stations being evolved Node Bs, also known as eNode Bs or eNBs. The network node 1 could also be in the form of g Node Bs, Node Bs, BTSs (Base Transceiver Stations) and/or BSSs (Base Station Subsystems), etc. Optionally, the network node 1 can be split in a central part and a remote radio part, e.g. as a distributed unit (DU) and centralised unit (CU) for a g Node B. The network node 1 provides radio connectivity in a radio access network (RAN) over a wireless interface to a plurality of user devices 2. The term user device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity.

The cellular communication network 8 may e.g. comply with any one or a combination of 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication occurs from the network node 1 to the user device 2 and uplink (UL) communication occurs from the user device 2 to the network node 1. The quality of the wireless radio interface to each user device 2 can vary over time and depends on the position of the user device 2, due to effects such as fading, multipath propagation, interference, etc.

The RAN may be operated by a different entity than the core network 3. Parts of the RAN can be provided centrally, i.e. in the cloud. The core network 3 is used for connectivity to central functions and a wide area network 7, such as the Internet. The core network 3 contains an operator node 30. The operator node 30 is used to enable, provide and verify measurements of resource usage. The core network 3 also contains many more entities not modified due to the embodiments presented herein, and which are thus not described here.

There are many computing devices 6 connected to the wide area network 7 using any suitable network as known in the art per se. The computing devices 6 are used to keep track of a distributed ledger database 5. The distributed ledger database 5 can e.g. be a blockchain based ledger such as Bitcoin, Ethereum or Hyperledger Fabric. Alternatively, the distributed ledger database 5 can be a non-blockchain based ledger such as IOTA and Hedera (hashgraph).

As described in more detail below, measurements of resource usage (such as data consumption and/or service consumption) and service level (such as latency, packet drop and guaranteed bandwidth compliance) by the user device 2 are collected by the network node 1. The network node 1 generates a measurement indicator to allow verification of the measurement data, and stores the measurement indicator in the distributed ledger database 5.

Figure 2:
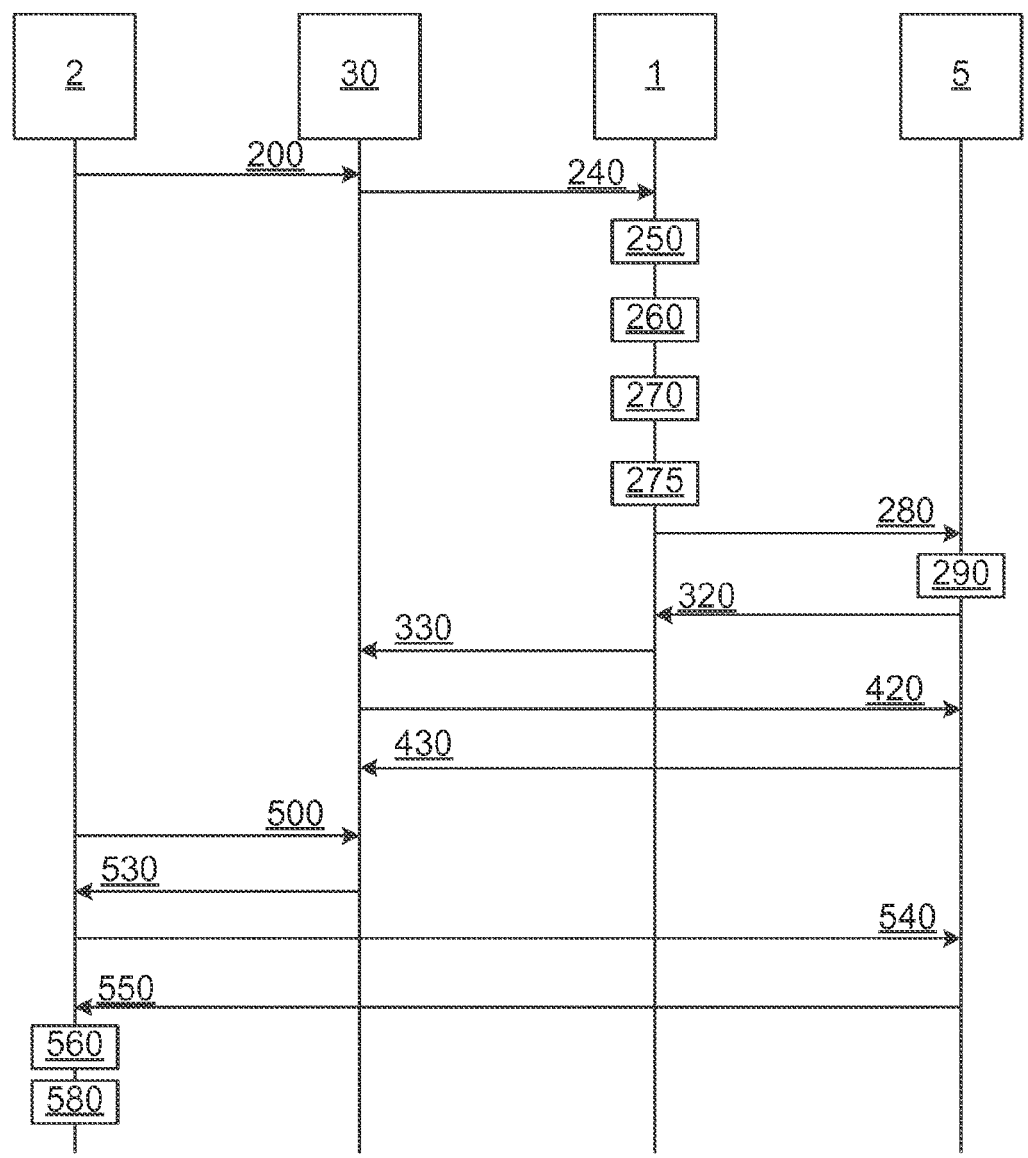
FIG. 2 is a signalling scheme illustrating communication between entities of FIG. 1 according to one embodiment.

FIG. 2 is a signalling scheme illustrating a sequence of communication between entities of FIG. 1 according to one embodiment.

Prior to this sequence starting, a digital certificate can be generated for the network node 1. The digital certificate is in the form of a cryptographic key pair which can be used for signing. Other technologies than digital certificates can be used to provide the key pairs for signing.

The vendor of the network node 1 can act as a (or under another) Certificate Authority (CA) that has registered a root certificate. The root certificate can be stored in the distributed ledger database 5. This allows identities stemming from the CA to be verified using the root certificate. In the network node 1, its certificate is stored in secure storage, denoted a trust anchor, e.g. based on TPM (Trusted Platform Module) or SGX (Software Guard Extensions).

The user device 2 triggers resource consumption 200 which is registered by the operator node 30. The actual delivery of service/data is not shown here.

The operator node 30 notifies 240 the network node 1 of the resource use. A monitoring entity in the network node 1 signals 250 internally the measurement data to the trust anchor within the network node. The network node 1 generates 260 a session identifier, e.g. as a random key string. At this point, the network node generates 270 a measurement indicator using a one-way function (e.g. hash function or message authentication code (MAC) functions). Furthermore, the measurement data is signed 275 together with the session identifier, yielding an asymmetric cryptographic signature. The asymmetric cryptographic signature proves that the measurement comes from the given trusted node, i.e. the network node produced by a bona fide vendor and not a fake node.

A set of data comprising the asymmetric cryptographic signature, the session identifier and the measurement indicator is then stored 280 in the distributed ledger database 5.

Upon receiving the set of data, the distributed ledger database 5 performs some internal processing 290, including e.g. activating a smart contract for handing this event. The distributed ledger database 5 also checks the signature using the root certificate, and the hash (or other one-way function result) of the data and the session identifier. If this verification is successful, the existing signature is transformed by computing a symmetric key based signature over the hash (or other one-way function result) of the measurement data and a data identifier using the session identifier as key. The data identifier can be used as a pointer to the set of data and could also be called an event identifier for the event of storing the set of data. Finally, the digital signature, the newly computed signature and the session identifier are stored in the distributed ledger database 5. The data identifier and time is stored as well but that is often inherent to the type of distributed ledger database.

Once the set of data is stored, the distributed ledger database 5 transmits 320 the data identifier to the network node 1. Since the data identifier is a pointer to the set of data stored in the distributed ledger database 5, this allows verification that a) the measurement data has not been tampered with (i.e. so-called integrity protection) b) the measurement comes from trustworthy node, and c) it will assign a time to the event.

The network node 1 then transmits 330 the data identifier to the operator node 30 which keeps this data for later billing of verification of agreed service level of the user.

When it is time to start billing the user or verifying agreed service level for the delivered service, the operator node 30 can retrieve all measurement data for the user for a specific time period and verify each measurement in the distributed ledger database 5. This is done by computing the signature and compare the computed value with the one in the distributed ledger database 5, by requesting 420 the distributed ledger database 5 using the data identifier, after which the distributed ledger database 5 responds 430 with the corresponding set of data. The bill can then be constructed by accumulating the resource usage and sent to the user of the user device.

If there is a dispute, the user device can query 500 the operator node 30 to get the details of the measurement data. The operator node 30 responds 530 with one or more instances of measurement data and corresponding data identifier(s).

This allows the user device to send a request 540 to the distributed ledger database 5 to receive 550 the set of data for each data identifier.

At this stage, if the user trusts the distributed ledger database 5, it is sufficient to check 560 the hashes (or other one-way function results) of the measurements, which is fast and does not require much computing resources.

If the user does not trust the distributed ledger database 5, it is possible to check 580 the signature using the digital signature forming part of the set of data. This presumes that the user device 2 has obtained the root certificate, e.g. as part of the set of data or from a separate data item stored in the distributed ledger database, optionally by consulting the CA.

In the above, the digital signature is stored in the distributed ledger database 5 as part of the set of data. Alternatively, the digital signature is stored in the operator node 30 along with the measurements.

It is to be noted that the measurement data can be stored separately by the operator node and does not need to be stored in the distributed ledger database, since the integrity of the measurement data can be checked using the procedure described above. Since the measurement data is not stored in the distributed ledger database, the distributed ledger database can be publicly accessible. Consequently, the distributed ledger database 5 can be operated by an external organization, separately from the operator node 30.

Figure 3A:
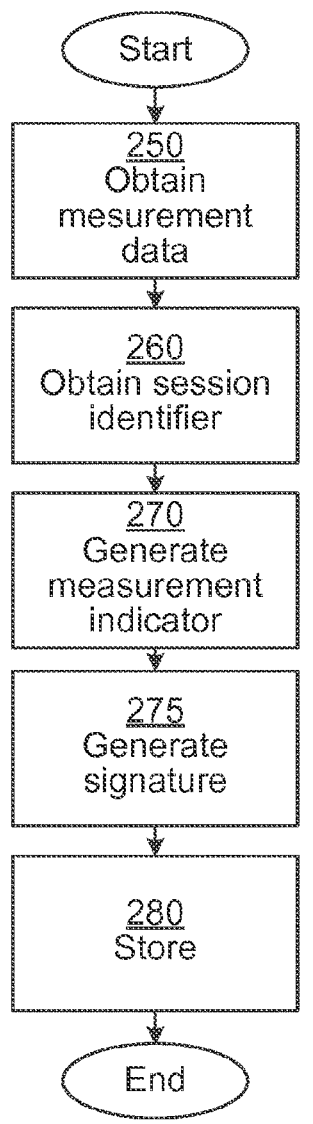
FIGS. 3A-B are flow charts illustrating embodiments of methods for enabling a user device to verify data integrity, performed in a network node.
Figure 3B:
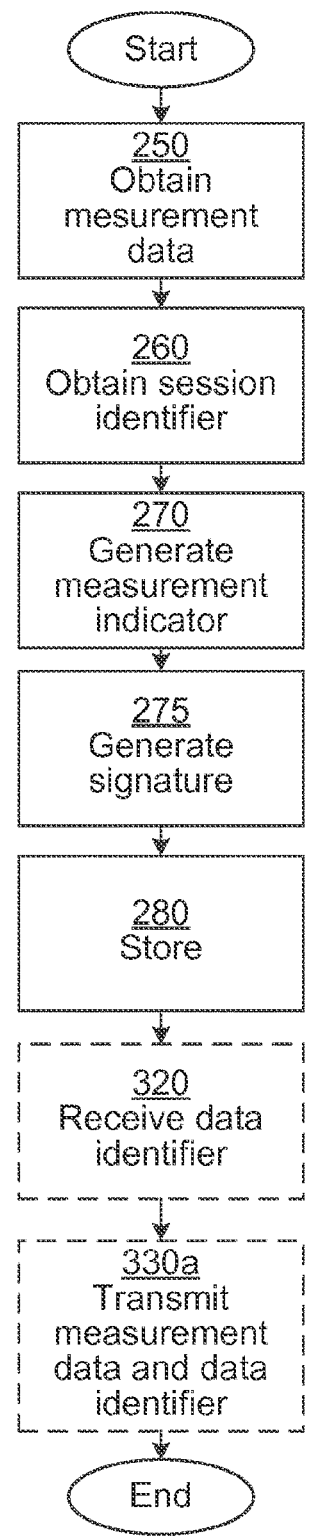

FIGS. 3A-B are flow charts illustrating embodiments of methods for enabling a user device to verify data integrity. The methods are performed in a network node and correspond to the activities of the network node illustrated in FIG. 2 and described above.

In an obtain measurement data step 250, the network node obtains measurement data indicating resource usage (e.g. data consumption and/or service consumption) by the user device.

In an obtain session identifier step 260, the network node obtains a session identifier. The session identifier is specific for the particular measurement data.

In a generate measurement indicator step 270, the network node generates a measurement indicator using a one-way function, based on the measurement data. The one-way function can e.g. be implemented as a hash function.

In a generate signature step 275, the network node generates an asymmetric cryptographic signature of the combination of the session identifier and the measurement indicator. The asymmetric cryptographic signature is based on a private key of a cryptographic key pair of the network node. The cryptographic key pair is specific for the network node.

In a store step 280, the network node stores, in a distributed ledger database, a set of data comprising the asymmetric cryptographic signature, the session identifier and the measurement indicator. The set of data may further comprise a public key of the cryptographic key pair.

Looking now to FIG. 3B, only new of modified steps compared to those of FIG. 3A are described.

In an optional receive data identifier step 320, the network node receives a data identifier from the distributed ledger database. The data identifier is associated with the set of data stored in the step of storing.

In an optional transmit measurement data and data identifier step 330a, the network node transmits the measurement data and the data identifier to an operator node.

Figure 4A:
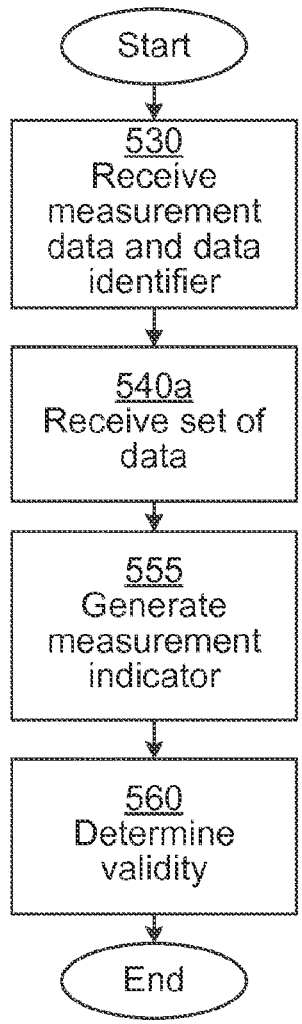
FIGS. 4A-B are flow charts illustrating embodiments of methods for enabling a user device to verify data integrity, performed in a user device.
Figure 4B:
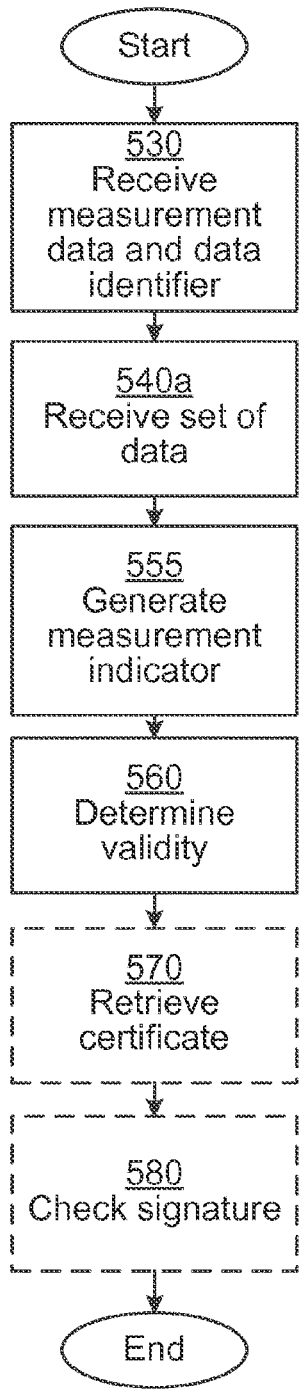

FIGS. 4A-B are flow charts illustrating embodiments of methods for enabling a user device to verify data integrity, performed in a user device and correspond to the activities by the user device in FIG. 2.

In a receive measurement data and data identifier step 530, the user device receives measurement data and a data identifier, e.g. from the network node.

In a receive set of data step 540a, the user device retrieves, using the data identifier, from a distributed ledger database, a set of data comprising a session identifier and a stored measurement indicator. The set of data may further comprise an asymmetric cryptographic signature.

In a generate measurement indicator step 555, the user device generates a verification measurement indicator using a one-way function, based on the measurement data.

In a determine validity step 560, the user device determines that the measurement data is valid when the stored measurement indicator and the verification measurement indicator match.

Looking now to FIG. 4B, only new of modified steps compared to those of FIG. 4A are described.

In an optional retrieve certificate step 570, the user device retrieves a digital certificate from the distributed ledger database.

In an optional check signature step 580, the user device checks the integrity of the session identifier and the measurement indicator based on the asymmetric cryptographic signature. When step 570 is performed, the integrity check can also be based on the digital certificate.

The set of data may further comprise a root certificate associated with the asymmetric cryptographic signature, in which case integrity check of the session identifier is based also on the root certificate.

Figure 5A:
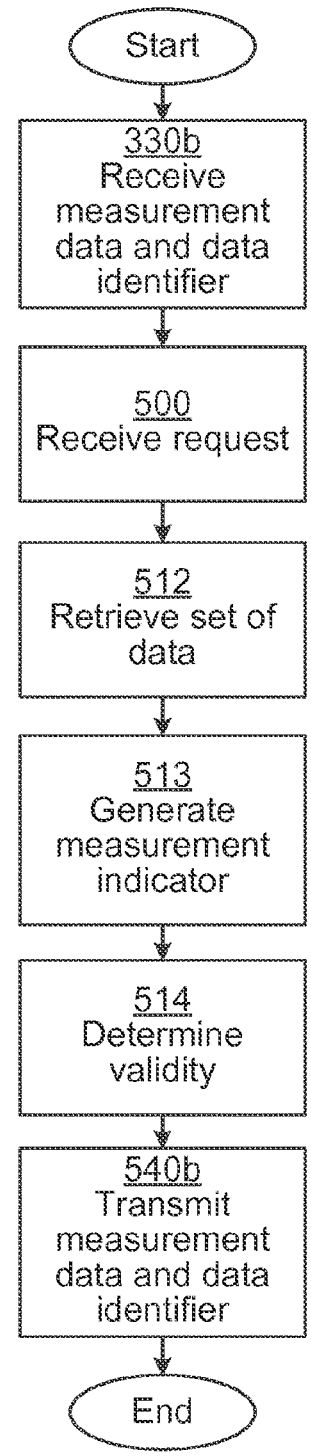

FIGS. 5A-B are flow charts illustrating embodiments of methods for enabling a user device to verify data integrity, performed in an operator node and correspond to the activities of the operator node of FIG. 2.

In a receive measurement data and data identifier step 330b, the operator node receives measurement data and a data identifier from a network node. The data identifier is associated with a stored set of data in a distributed ledger database. The measurement data indicates resource usage by the user device. The measurement data and data identifier is stored by the operator node.

In a receive request step 500, the operator node receives a request for measurement data from a user device.

In a retrieve set of data step 512, the operator node retrieves, using the data identifier, from a distributed ledger database, a set of data comprising a session identifier and a stored measurement indicator.

In a generate measurement indicator step 513, the operator node generates a verification measurement indicator using a one-way function, based on the measurement data.

In a determine validity step 514, the operator node determines that the measurement data is valid when the stored measurement indicator and the verification measurement indicator match.

In a transmit measurement data and data identifier step 540b, the operator node transmits measurement data and a data identifier to the user device when the measurement data is determined to be valid.

Looking now to FIG. 5B, only new of modified steps compared to those of FIG. 5A are described.

In an optional retrieve certificate step 515, the operator node retrieves a digital certificate from the distributed ledger database.

In an optional check signature step 516, the operator node checks the integrity of the session identifier and the measurement indicator based on an asymmetric cryptographic signature. When this is performed, the cryptographic signature forms part of the set of data retrieved in step 512. When step 515 is performed, the integrity check in step 514 can also be based on the digital certificate While the methods described above relate to a single user device, the methods are performed for many user devices of the cellular communication network in the same way.

FIG. 6 is a schematic diagram illustrating components of each one of the network node 1, user device 2 and operator node 30 of FIG. 1. In FIG. 6, all reference numerals ending with 'a', i.e. 60a, 62a, 64a, 67a, 66a, form part of the network node 1. All reference numerals ending with 'b', i.e. 60b, 62b, 64b, 67b, 66b form part of the user device 2. All reference numerals ending with 'c', i.e. 60c, 62c, 64c, 67c, 66c form part of the operator node 30. A respective processor 60a, 60b, 60c is provided using any combination of one or more of a suitable central processing unit (CPU), multi-processor, microcontroller, digital signal processor (DSP), etc., capable of executing respective software instructions 67a, 67b, 67c stored in a respective memory 64a, 64b, 64c, which can thus be a computer program product. The processor 60a, 60b, 60c could alternatively be implemented using an application specific integrated circuit (ASIC), field programmable gate array (FPGA), etc. The processor 60a of the network node 1 can be configured to execute the method described above with reference to FIGS. 3A-B. The processor 60b of the user device 2 can be configured to execute the method described above with reference to FIGS. 4A-B. The processor 60c of the operator node 30 can be configured to execute the method described above with reference to FIG. 5A-B.

The memory 64a, 64b, 64c can be any combination of random access memory (RAM) and/or read only memory (ROM). The memory 64a, 64b, 64c also comprises persistent storage, which, for example, can be any single one or combination of magnetic memory, optical memory, solid-state memory or even remotely mounted memory.

A respective data memory 66a, 66b, 66c is also provided for reading and/or storing data during execution of software instructions in the processor 60a, 60b, 60c. The data memory 66a, 66b, 66c can be any combination of RAM and/or ROM.

A respective I/O interface 62a, 62b, 62c is provided for communicating with external and/or internal entities. Optionally, the I/O interface 62a, 62b, 62c also includes a user interface.

Other components of the network node 1, user device 2 and operator node 30 are omitted in order not to obscure the concepts presented herein.

FIG. 7 is a schematic diagram showing functional modules of the network node of FIG. 1 according to one embodiment. The modules are implemented using software instructions such as a computer program executing in the network node 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A measurement data obtainer 70 corresponds to step 250. A session identifier obtainer 71 corresponds to step 260. A measurement indicator generator 72 corresponds to step 270. A signature generator 73 corresponds to step 275. A storer 74 corresponds to step 280. A data identifier obtainer 75 corresponds to step 320. A data transmitter 76 corresponds to step 330a.

Figure 8:
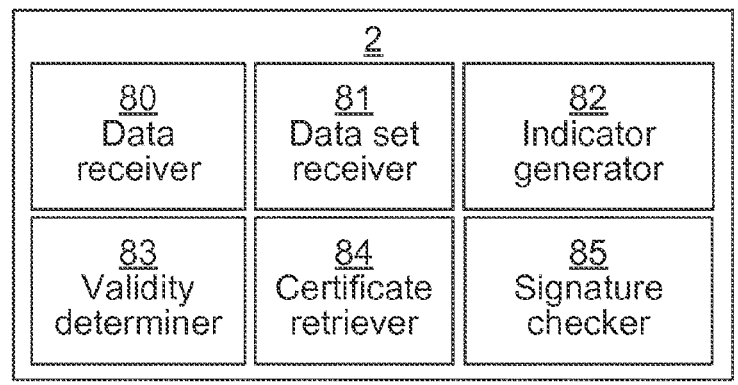
FIG. 8 is a schematic diagram showing functional modules of the user device of FIG. 1 according to one embodiment.

FIG. 8 is a schematic diagram showing functional modules of the user device 2 of FIG. 1 according to one embodiment. The modules are implemented using software instructions such as a computer program executing in the user device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A and 4B.

A data receiver 80 corresponds to step 530. A data set receiver 81 corresponds to step 540a. An indicator generator 82 corresponds to step 555. A validity determiner 83 corresponds to step 560. A certificate retriever 84 corresponds to step 570. A signature checker 85 corresponds to step 580.

Figure 9:
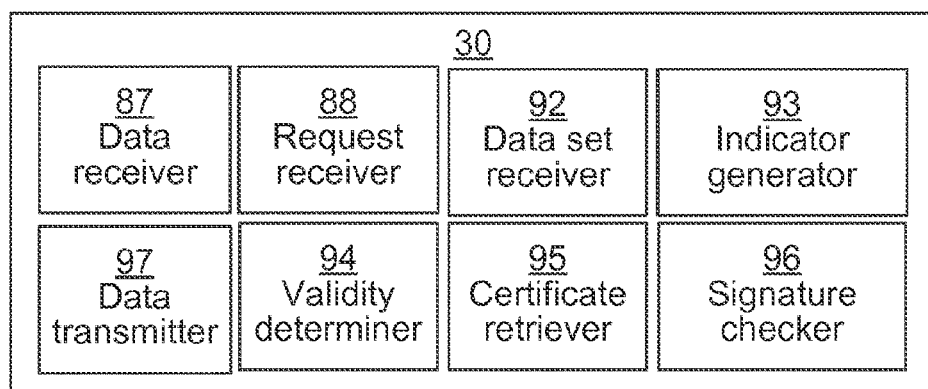
FIG. 9 is a schematic diagram showing functional modules of the operator node of FIG. 1 according to one embodiment.

FIG. 9 is a schematic diagram showing functional modules of the operator node 30 of FIG. 1 according to one embodiment. The modules are implemented using software instructions such as a computer program executing in the operator device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A data receiver 87 corresponds to step 330b. A request receiver 88 corresponds to step 500. A data set receiver 92 corresponds to step 512. An indicator generator 93 corresponds to step 513. A validity determiner 94 corresponds to step 514. A certificate retriever 95 corresponds to step 515. A signature checker 96 corresponds to step 516. A data transmitter 97 corresponds to step 540b.

Figure 10:
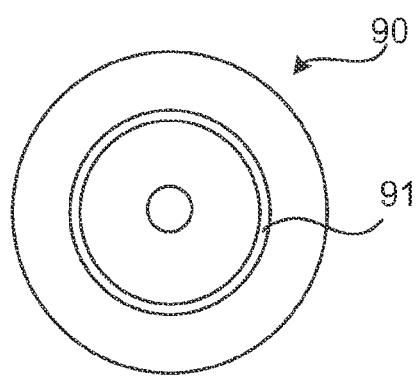
FIG. 10 shows one example of a computer program product comprising computer readable means.

FIG. 10 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling a user device to verify data integrity, the method being performed in a network node and comprising:
    obtaining measurement data indicating resource usage by the user device;
    obtaining a session identifier;
    generating a measurement indicator using a one-way function, based on the measurement data;
    generating an asymmetric cryptographic signature of the session identifier and the measurement indicator, the asymmetric cryptographic signature being based on a private key of a cryptographic key pair of the network node; and
    storing, in a distributed ledger database, a set of data comprising the asymmetric cryptographic signature, the session identifier and the measurement indicator.

2. The method according to claim 1, further comprising:
    receiving a data identifier from the distributed ledger database, the data identifier being associated with the set of data stored in the step of storing; and
    transmitting the measurement data and the data identifier to an operator node.

3. The method according to claim 1, wherein the one-way function is a hash function.

4. The method according to claim 1, wherein the set of data further comprises a public key of the cryptographic key pair.

5. The method according to claim 1, wherein the cryptographic key pair is specific for the network node.

6. A network node for enabling a user device to verify data integrity, the network node comprising:
    a processor; and
    a memory storing instructions that, when executed by the processor, cause the network node to:
    obtain measurement data indicating resource usage by the user device;
    obtain a session identifier;
    generate a measurement indicator using a one-way function, based on the measurement data;
    generate an asymmetric cryptographic signature of the session identifier and the measurement indicator, the asymmetric cryptographic signature being based on a private key of a cryptographic key pair of the network node; and
    store, in a distributed ledger database, a set of data comprising the asymmetric cryptographic signature, the session identifier and the measurement indicator.

7. The network node according to claim 6, further comprising instructions that, when executed by the processor, cause the network node to:
    receive a data identifier from the distributed ledger database, the data identifier being associated with the set of data stored in the step of storing; and
    transmit the measurement data and the data identifier to an operator node.

8. The network node according to claim 6, wherein the one-way function is a hash function.

9. The network node according to claim 6, wherein the set of data further comprises a public key of the cryptographic key pair.

10. The network node according to claim 6, wherein the cryptographic key pair is specific for the network node.

11. A method for enabling a user device to verify data integrity, the method being performed in the user device and comprising:
    receiving measurement data and a data identifier;
        retrieving, using the data identifier, from a distributed ledger database, a set of data comprising a session identifier and a stored measurement indicator;
        generating a verification measurement indicator using a one-way function, based on the measurement data; and
        determining that the measurement data is valid when the stored measurement indicator and the verification measurement indicator match.

12. The method according to claim 11, wherein the set of data further comprises an asymmetric cryptographic signature; and
    wherein the method further comprises:
    checking integrity of the session identifier and the measurement indicator based on the asymmetric cryptographic signature.

13. The method according to claim 12, further comprising:
    retrieving a digital certificate from the distributed ledger database; and
    wherein checking integrity is also based on the digital certificate.

14. The method according to claim 12, wherein the set of data further comprises a root certificate associated with the asymmetric cryptographic signature, and wherein checking integrity of the session identifier is based also on the root certificate.

15. A user device for enabling the user device to verify data integrity, the user device comprising:
    a processor; and
    a memory storing instructions that, when executed by the processor, cause the user device to:
    receive measurement data and a data identifier;
    retrieve, using the data identifier, from a distributed ledger database, a set of data comprising a session identifier and a stored measurement indicator;
    generate a verification measurement indicator using a one-way function, based on the measurement data; and
    determine that the measurement data is valid when the stored measurement indicator and the verification measurement indicator match.

16. The user device according to claim 15, wherein the set of data further comprises an asymmetric cryptographic signature; and
    wherein the user device further comprises instructions that, when executed by the processor, cause the user device to:
    check integrity of the session identifier and the measurement indicator based on the asymmetric cryptographic signature.

17. The user device according to claim 16, further comprising instructions that, when executed by the processor, cause the user device to:
    retrieve a digital certificate from the distributed ledger database; and
    wherein the instructions to check integrity comprises instructions that, when executed by the processor, cause the user device to also base the checking on the digital certificate.

18. The user device according to claim 16, wherein the set of data further comprises a root certificate associated with the asymmetric cryptographic signature, and wherein the instructions to check integrity of the session identifier comprise instructions that, when executed by the processor, cause the user device to check integrity based also on the root certificate.

19. A method for enabling a user device to verify data integrity, the method being performed in an operator node and comprising:
    receiving measurement data and a data identifier from a network node, the data identifier being associated with a stored set of data in a distributed ledger database;
    receiving a request for measurement data from a user device;
    retrieving, using the data identifier, from a distributed ledger database, a set of data comprising a session identifier and a stored measurement indicator;
    generating a verification measurement indicator using a one-way function, based on the measurement data;
    determining that the measurement data is valid when the stored measurement indicator and the verification measurement indicator match; and
    transmitting measurement data and a data identifier to the user device when the measurement data is determined to be valid.

20. The method according to claim 19, wherein the set of data further comprises an asymmetric cryptographic signature; and
    wherein the method further comprises:
    checking integrity of the session identifier and the measurement indicator based on the asymmetric cryptographic signature.

* * * * *